Patented Aug. 29, 1944

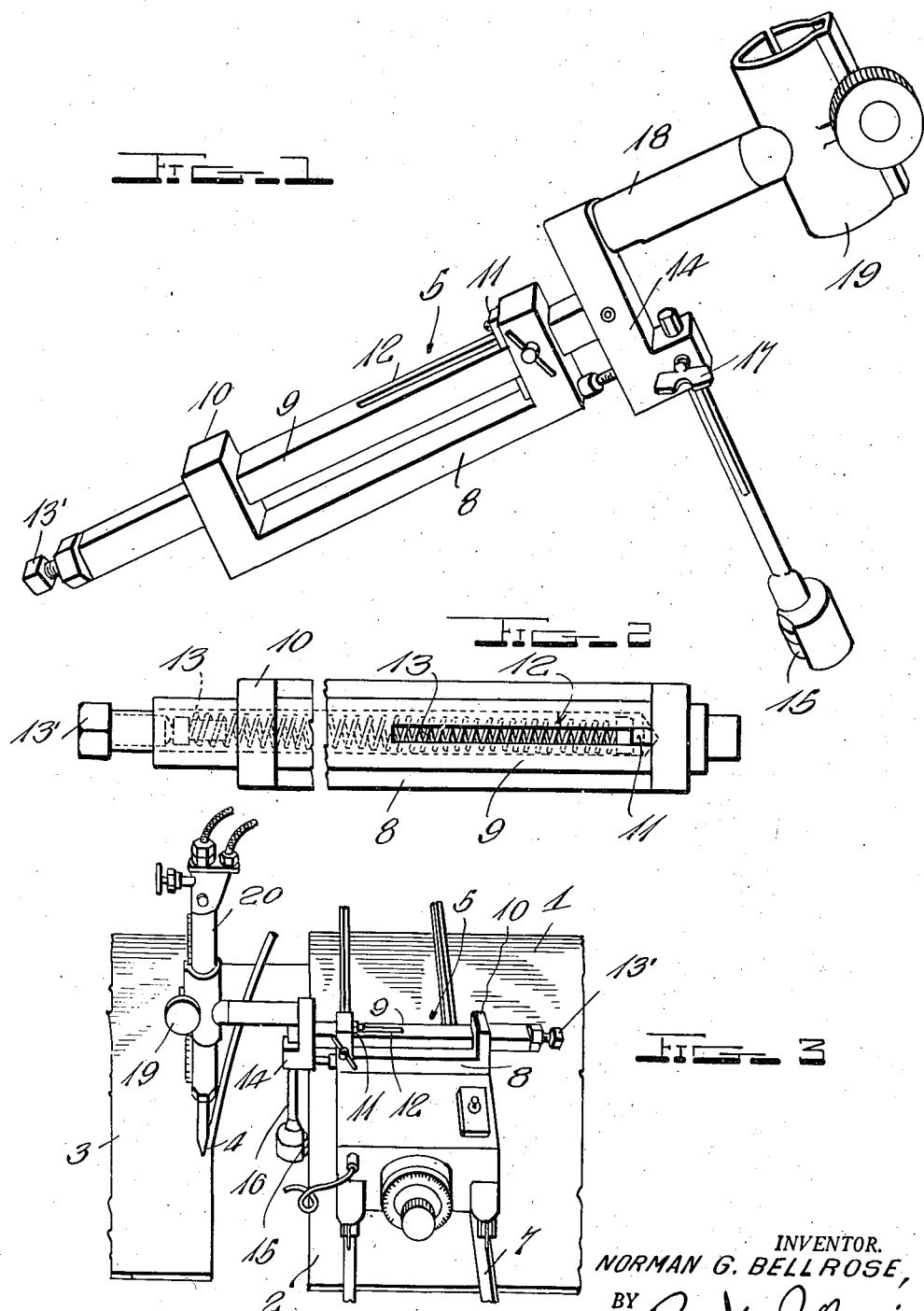

2,356,811

UNITED STATES PATENT OFFICE 2,356,811

CUTTING TORCH HOLDER

Norman G. Bellrose, Long Beach, Calif.

Application April 8, 1943, Serial No. 482,301

5 Claims. (Cl. 33—41)

This invention relates to a cutting torch holder whereby an adjacent sheet of metal is cut so as to conform to the edge of a metal plate, as in placing a metal plate on the sides or deck of a ship.

An object of my invention is to provide a novel cutting torch holder which can be moved transversely of a metal plate, there being a guide roller which travels over the edge of the so-called master plate against which an adjacent plate is to fit, the cutting torch being moved in a path conforming to the shape of the so-called master plate.

Another object of my invention is to provide a novel cutting torch holder in which the carrying arm is yieldably pressed inwardly, thus holding the guide roller against the guiding edge of a plate and also accurately holding the cutting torch so that the edge of an adjacent metal plate is accurately cut.

A feature of my invention resides in the novel adjustments on the guide roller, on the tension spring, and on the means of clamping the supporting arm as desired.

Other objects, advantages, and features of invention may appear from the accompanying drawing, the subjoined detailed description, and the appended claims.

In the drawing

Figure 1 is a perspective view of my cutting torch holder.

Figure 2 is a fragmentary plan view of the guide frame and supporting bar.

Figure 3 is a perspective view of my cutting torch holder in operative position.

Referring more particularly to the drawing, the numeral 1 indicates a metal plate which will be termed the master plate, the edge 2 of which may be irregular in shape or curved, and 3 indicates an adjacent plate, the edge 4 of which is to be cut so as to conform with the edge 2.

The cutting torch holder 5 is mounted on a carriage 6 which moves on rails 7. The carriage and rails are well known and usual in construction, and the details of this portion forms no part of this invention. The torch holder 5 includes a substantially U-shaped frame 8 which is suitably attached to the carriage 6. A bar 9 is slidably mounted in the arms 10 of the frame 8. The bar 9 is non-rotatable in the arms 10, that is, this bar may be square or may be formed with a suitable guide slot, receiving a pin or other suitable means of preventing rotation. A pin 11 extends upwardly from the frame 8 and through longtitudinally extending slots 12 in the bar 9, thus the bar can move longitudinally a considerable distance as guided by the edge 2 of the master plate 1.

A coil spring 13 bears at one end against the pin 11 and the other end bears against an adjusting nut 13' in the end of the bar 9. The spring 13 thus yieldably urges the bar 9 inwardly at all times. A head 14 is mounted on the outer end of the bar 9, and this head carries a roller 15 which bears against the edge 2 of the master plate 1. The roller 15 is mounted on a stem 16 which extends into the head 14, and a setscrew 17 in the head bears against the stem 16, thus permitting a vertical adjustment of the roller. A horizontal post 18 on the head 14 is provided with a split clamp 19 on its outer end, and this clamp encircles and grips the cutting torch 20 holding said cutting torch in position. The cutting torch may be adjusted vertically in the clamp 19 in a self-evident manner.

In operation the rails 7 are mounted on the plate 1 and spaced somewhat from the edge 2. The carriage 6 is then placed on these rails, and the bar 9 is drawn outwardly and the roller 15 lowered until this roller engages the edge 2. Thus there is a spring tension on the bar 9 urging it inwardly and pressing the roller 15 against the edge 2. The carriage 6 is then slowly moved along its rails, and the cutting torch 20 will cut the edge 4 of the plate 3 to conform to the edge 2.

Having described my invention, I claim:

1. A tool holder comprising a substantially U-shaped frame, a hollow bar slidably mounted in said frame, a head on one end of said bar, a vertical clamp on the head, said clamp being adapted to grip a tool and support the same vertically, a guide roller, a stem on which the guide roller is mounted extending upwardly therefrom and adjustably mounted in the head, said hollow bar having opposed longitudinal slots therein, a pin rising from the frame and extending through said slots, a coil spring in the hollow bar, one end of the spring bearing against said pin, an adjusting screw in one end of said bar, said spring bearing against said adjusting screw at its other end.

2. A tool holder comprising a frame having a body adapted to be mounted upon a carriage transversely thereof and provided with upstanding arms at its inner and outer ends, a bar extending longitudinally of said frame in upwardly spaced parallel relation to the body and slidably passing through said arms, said bar being hollow and open at its inner end and formed with opposed longitudinally extending slots, a pin carried by said frame and passing through the slots of said bar, a helical spring in said bar having one end abutting said pin, a screw threaded into the inner end of said bar and engaging the adjacent end of said screw for adjusting tension of the spring, said spring urging the bar inwardly, a vertically disposed head at the outer end of said bar provided at its lower end with an outstanding lug formed with a vertical bore, a horizontal post extending outwardly from the upper end of said head and provided with a tool-gripping clamp at its outer end, a stem disposed vertically with its upper end portion passing through the bore of said lug, a roller at the lower end of said stem, and a set screw carried by said lug for engaging said stem and securing the stem in a vertically adjusted position.

3. A tool holder comprising a frame adapted to be mounted horizontally upon a carriage and provided with upstanding arms at its inner and outer ends, a hollow bar extending longitudinally of said frame and slidably carried by said arms, a spring in said bar, an abutment carried by the outer end of said frame and engaging one end of said spring, a member adjustably carried by the inner end of said bar and engaging the adjacent end of said spring, said spring urging the bar inwardly, a vertically disposed head at the outer end of said bar provided at its lower end with an outstanding lug formed with a vertical bore, a stem slidable vertically through the bore, a roller at the lower end of said stem, a set screw for releasably holding said stem in a vertically adjusted position, and a horizontal post extending outwardly from the upper end of said head and provided with a tool-gripping clamp at its outer end.

4. A tool holder comprising a frame adapted to be mounted horizontally upon a carriage and provided with upstanding arms at its inner and outer ends, a hollow bar extending longitudinally of said frame and slidably carried by said arms, a spring in said bar, an abutment carried by the outer end of said frame and engaging one end of said spring, a member adjustably carried by the inner end of said bar and engaging the adjacent end of said spring, said spring urging the bar inwardly, a vertically disposed head at the outer end of said bar, a vertically adjustable stem carried by said head and extending downwardly therefrom, a roller at the lower end of said stem, and a post extending outwardly from the upper portion of said head and provided with a tool-engaging clamp at its outer end.

5. A tool holder comprising a frame adapted to be mounted upon a carriage transversely thereof and having upstanding arms at its inner and outer ends, a bar extending longitudinally of said frame and slidably carried by said arms, a vertically disposed head at the outer end of said bar having an outwardly projecting lug at its lower end formed with a vertical bore, a stem slidable vertically through said bore, a roller at the lower end of said stem mounted for turning about a vertical axis, means carried by said lug for securing the stem in a vertically adjusted position, a post projecting outwardly from the upper end of said head, a vertically disposed tool-gripping clamp at the outer end of said post, and a spring for urging said bar inwardly.

NORMAN G. BELLROSE.